United States Patent [19]
Lukac-Kuruc

[11] Patent Number: 5,734,682
[45] Date of Patent: Mar. 31, 1998

[54] METHOD FOR INCREASING TRANSMISSION RATE

[76] Inventor: Eric Lukac-Kuruc, Godshuisstraat, 18a, 1861, Meise, Belgium

[21] Appl. No.: 522,309
[22] PCT Filed: Feb. 28, 1994
[86] PCT No.: PCT/BE94/00017
  § 371 Date: Sep. 5, 1995
  § 102(e) Date: Sep. 5, 1995
[87] PCT Pub. No.: WO94/21070
  PCT Pub. Date: Sep. 15, 1994

[30] Foreign Application Priority Data

Mar. 2, 1993 [BE] Belgium ............... 9300195

[51] Int. Cl.$^6$ ................................. H04L 25/34
[52] U.S. Cl. ................ 375/286; 375/288; 375/289; 341/57; 341/61
[58] Field of Search .................. 375/242, 259, 375/260, 264, 286, 288, 289; 341/56, 57, 61, 68, 69, 70

[56] References Cited

U.S. PATENT DOCUMENTS

| | | | |
|---|---|---|---|
| 3,753,113 | 8/1973 | Maruta et al. | 375/292 |
| 4,506,252 | 3/1985 | Jacoby et al. | 340/347 |
| 4,630,287 | 12/1986 | Armstrong | 375/261 |
| 5,384,769 | 1/1995 | Oprescu et al. | 370/24 |
| 5,533,054 | 7/1996 | DeAndrea et al. | 375/286 |

FOREIGN PATENT DOCUMENTS

| | | |
|---|---|---|
| 0522244 | 1/1993 | European Pat. Off. . |
| 2329109 | 5/1977 | France . |
| 2460573 | 1/1981 | France . |

OTHER PUBLICATIONS

Patent Abstract of Japan vol. 13, No. 404 (E-817) Jun. 7, 1989 & JP-A-01,146,276 (Komatsu).
"The Midi Resource Book" by Steve de Furia and Joe Scacciaferro, Hal Leonard books ISBN 0-88188 587-8, pp. 1-2, 17-24, 144-145.
"Mind over MIDI" by Lachlan Westfall, Keyboard-ISSN, 0730-0158, Aug. 1990, p. 85.
"Future Imperfect—The future of MIDI" by Jim Aikin, Jeff Rona and Chris Meyer, Keyboard ISSN 0730-0158, May 1990, pp. 56-70.
"S Systems" by John Strawn, Email of Nov. 18, 1994.
"XM marks the spot" by Scott Wilkinson, Electronic Musician, ISSN 0884-472, May 1995, p. 146.
"The XM SPEC: Is MIDI 2.0 finally at hand" by unknown author, Keyboard, ISSN 0730-1058, Jun. 1995, p. 24.
"Ask Mr. MIDI—1 man's work—A European twist of the spec" by Anthony Mc Lean, Live Sound International, ISSN 1077-5447, Sep. 1995, pp. 4-7.
"XMIDI" by Mathieu V. & Jean-Louis Gayet, MIDI Bulletin, ISSN 0926-5465, Jan. 1995, pp. 4-7.
"XMIDI" by Didier de Roos, Meet Music Magazine, ISSN, Dec. 1994, pp. 44-46.
"XMIDI—Is the MI industry ready for XMIDI?—After 12 years, MIDI gets turbocharged!" by Jon Maye, The Music Paper, Studio Exchange, Jan. 1996, p. 39.

Primary Examiner—Stephen Chin
Assistant Examiner—Amanda T. Le
Attorney, Agent, or Firm—Horst M. Kasper

[57] ABSTRACT

The off-state of the binary transitions is used in order to possibly generate symmetrical transitions of the active state of the binary transitions in relation to the off-state, in order to replace the two-state logic of at least one binary transition capable to go to the rest-state by a three-state logic.

5 Claims, 5 Drawing Sheets

METHOD FOR INCREASING TRANSMISSION RATE

BACKGROUND OF THE INVENTION

1. Field of the Invention

The invention is dealing with a process to transmit information over an electrical support. It deals more specifically with the transmission of digital information flowing serially in a time sequence over the support.

2. Brief Description of the Background of the Invention Including Prior Art

It is known from a long time to transmit information in serial sequence over an electrical support with various methods. It is known for instance processes and systems to transmit information between musical instruments according to the MIDI (Musical Instruments Digital Interface) interface standard. Frequently, according to the coding of the information peculiar to the transmission process considered, it is not uncommon to be limited by the amount of various distinct coded messages which the transmission process can pass along over the support. In the case of the MIDI standard, for instance, one quickly comes up against the absolute limit of 16 addresses (also called channels) of various distinct instruments which the system is able to cope with.

SUMMARY OF THE INVENTION

1. Purposes of the Invention

The invention aims to remedy the drawbacks of the known processes by offering a process which allows to increase the amount of various distinct messages the system is able to convey while maintaining the compatibility with existing systems.

These and other objects and advantages of the present invention will become evident from the description which follows.

2. Brief Description of the Invention

To this end, the invention deals with a process for the transmission of a larger quantity of information between at least two devices according to which the elements of information which are succeeding each others in time are passed along over an electrical support, said information elements being made of a packet of binary transitions forming messages which comprise one or more data and/or addresses of the devices for which these data are intended, while said process does not increase the amount of transitions flowing over the support and allows nevertheless to increase the amount of various distinct messages the system is able to convey. According to the invention, the off-state of the binary transitions is used in order to possibly generate symmetrical transitions of the active state of the binary transitions with regard to their off-state in order to enrich the content of the message by replacing the two-state logic of at least one binary transition able to take the off-state by a three-state logic.

By information, it is intended to designate any message in which the semantic content may be coded.

According to the invention, devices are information transmitters, information receivers, or combined information transmitters and receivers (transceivers).

According to the invention, the information elements are succeeding each others in time over an electrical support. By succeeding each others, we intend to define a transmission of the information elements one by one in a time sequence, any element using alone the whole information capacity of the support. By electric support, we mean any mean able to convey an electrical signal from a point to another. Those supports will be mostly realized by means of one or more electric conductors under the form of one or more wires isolated between them and assembled in a cable terminated by connectors. The coding of information over the electric support can be done by any known way. It may, for instance, be realized by means of a voltage, of a current, of a phase or of any other way compatible with the support.

According to the invention, the information elements are made of a set of binary and ternary transitions succeeding each others in time. When the coding of the information is done by means of a voltage, a binary transition is performed by a sudden jump from the rest-voltage to the on-voltage (active state) or else from the on-voltage to the rest-voltage. Things go similar when the coding is realized through other means. Sets of binary and ternary transitions, also called binary and ternary transition packets, form messages dedicated to the devices connected over the electrical support. Any message contains one or more data dedicated to one or more devices. The message may also include binary and ternary transitions reserved to the addresses of each device. The function of those addresses is to identify a particular device and to allow to personify those messages dedicated to that particular device.

According to the invention, the information elements are succeeding each others in time over an electrical support. By succeeding each others, we intend to define a transmission of the information elements one by one in a time sequence, any element using alone the whole descriptive capacity of the support. By electric support, we mean any mean able to convey an electrical signal from a point to another. These supports will be mostly realized by means of one or more electric cables made of one or more wires isolated between them and assembled in a cable terminated by connectors. The information coding over the electric support can be done by any known way. It may for instance be realized by means of a voltage, a current, a frequency, a phase or any other way compatible with the support.

According to the invention, the information elements are made of an ensemble of binary and ternary transitions succeeding each others in time. When the coding of the information is done by means of a voltage, a binary transition is materialized by a sudden jump from the rest-voltage to the on-voltage (active state) or else from the on-voltage to the rest-voltage. It goes similarly when the coding is realized through other means. The ensembles of binary and ternary transitions, also known as binary and ternary transition packets, form messages dedicated to the devices connected to the electrical support. Each message contains one or more data dedicated to one or more devices. The message may also include binary and ternary transitions reserved to the addresses of each device. These addresses do exist to identify a particular device and to allow the characterization of some messages dedicated to that particular device.

According to the invention, one or more transitions, symmetrical of the active state of the binary transitions with regard to their off-state are generated. By symmetrical transition, it must be understood a transition symmetrical of the normal transition with regard to the neutral state. For a coding by means of a current, for instance, the normal binary transition will be realized by means of the activation (or de-activation) of an electrical current, whereas the symmetrical transition will be realized by means of the activation (or de-activation) of a current flowing in the opposite direction over the same electrical conductor. Likewise, for a coding by means of a voltage, the normal binary transition can be realized by means of a positive electrical voltage step, and the symmetrical transition will be realized by means of a negative voltage step with regard to the same level of null voltage. The amount of supplementary various messages allowed by the generation of n symmetrical binary transitions in a system wherein the messages comprises m binary transitions in series is given by the following formula:

$$N_{sup}=[3^n \cdot 2^{(m-n)}]-2^m$$

where n and m are integer values so that n is smaller or equal to m. The three-state logic which, according to the invention, replaces the two-state logic (represented by 0 and 1 states), is a logic wherein each informational element is only allowed to take any of the three different values represented by −1, 0 and 1.

A preferred embodiment of the process according to the invention consists in the detection of the presence of the addressed devices. This detection can be done by any means adapted to the information coding scheme realized. If, for example, the coding is realized by means of a current, one can detect the voltage drop due to this current in resistors inserted in series in the support circuit. This voltage drop may be used, for instance, to generate a logical acknowledge signal dedicated to the emitting device.

It is especially advantageous, according to the invention, to adapt the message flowing frequency to the maximum frequency allowed by all the devices present in the setup. It is possible, for example, after the transmission from the emitting device of a message requesting to switch over to a higher frequency, this message being sent itself on some basis frequency, to further wait for the acknowledge messages from the receivers, then switch over to this higher frequency and so on until the totality of the acknowledge signals is not received. It remains then to stay with the attained frequency for the remaining of the communications.

An advantageous coding scheme of the binary information flowing over the support is a coding done by means of a current. According to this coding scheme, the two binary levels are materialized by the presence or absence of a current. It does not matter whether the binary level 1 is materialized by the absence or by the presence of a current. Practically, a realization having shown good results is the one wherein the binary level 1 is materialized by the absence of current and the binary level 0, by its presence.

The invention concerns as well the use of the process for the communication of data related to musical equipment according to the MIDI communication standard. According to this use, a 5 mA current coding is used for the binary level 0 and said current is stopped for the logic level 1. The basis frequency of such a MIDI communication system is of 31.25 Kbaud in accordance with an asynchronous protocol, each message comprising one binary transition ("bit") for the beginning of the message ("start-bit" at the active state, i.e. the state 0), 8 data bits and one bit for the end of the message ("stop-bit" at the rest state, i.e. the state 1).

According to the MIDI standard, the connectors located at the end of the cables of the information support are normalized 5 pin DIN connectors (180 degees). The pins labeled 4 and 5 are used for the connection of the current loop conveying the information, the pin 2 is not connected (case of a "MIDI In" port) or is connected to the cable shielding (case of a "MIDI Out" or "MIDI Thru" port). The pins 1 and 3 are not connected.

According to another embodiment of the process complying with the invention, it is also possible to generate additional binary and/or ternary transitions over a second support. The second support is an electrical support parallel to the first support. The information coding onto this second support can be realized in a different way than the one used over the first support. For example, the information over the first support can be coded by means of a current and over the second support by means of a voltage. It is preferred however, in the majority of cases, to realize the coding of the information by a similar way over the two supports.

According to a preferred scheme of this embodiment of the invention, a second current loop is connected to the unused pins 1 and 3 of the same 5 pin DIN connector in order to realize a second information support.

The invention concerns also a system for the communication of information in accordance with the process of the invention and for its use for the communication of information related to the operation of musical devices according to the MIDI standard.

The invention concerns as well a system for the communication of information, according to which the emitting device holds a reverse current over the support and the receiving device is modulating this current in order to send information back to the emitting device and so implement an alternate bidirectional communication system ("half-duplex" system).

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
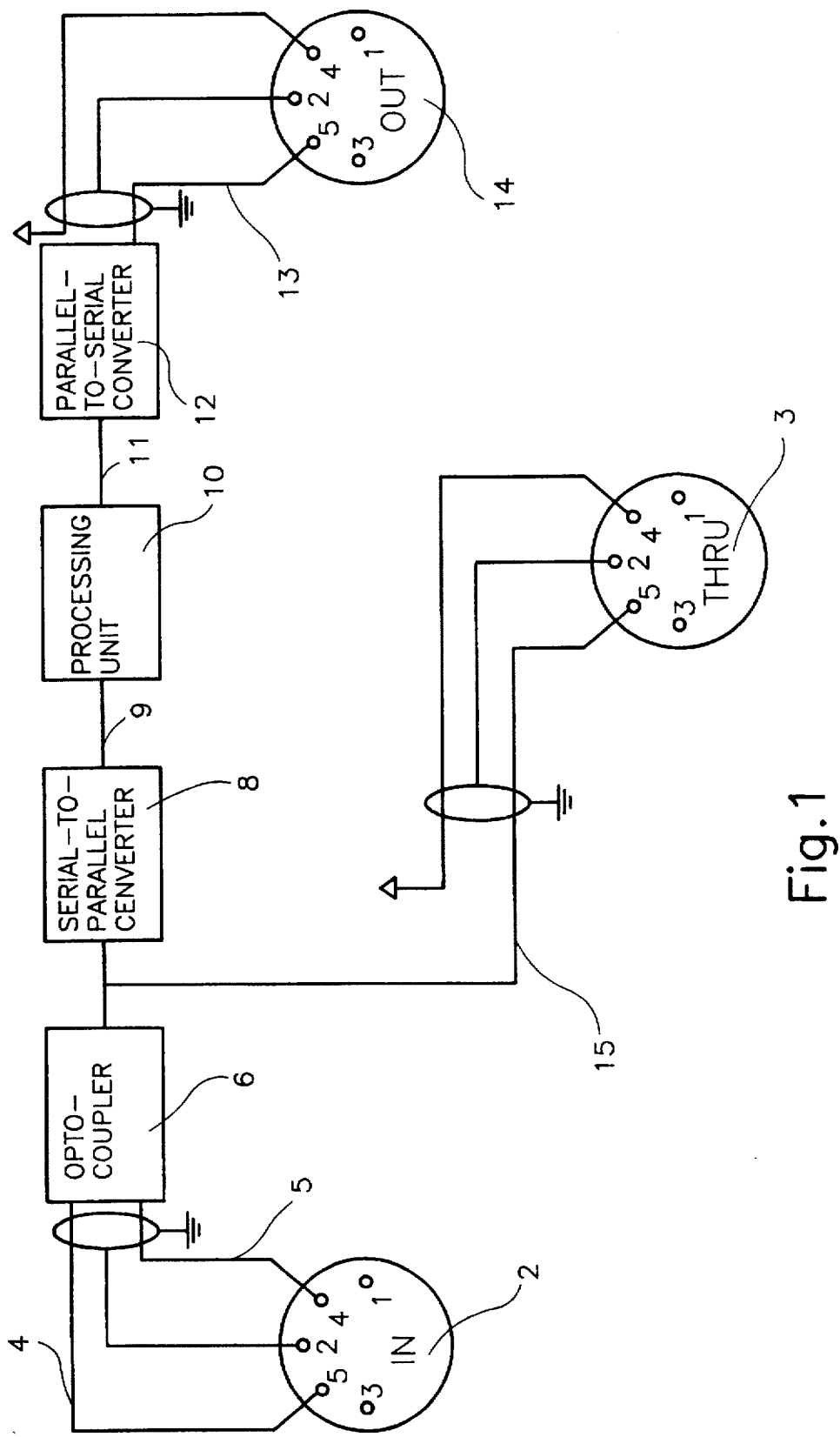
FIG. 1 shows a device of the state of the art.

FIG. 1 shows a device according to the state of the art. The information flowing over the support enters the device through pins 4 and 5 of the normalized DIN connector 2 (labeled IN) connected to an opto-coupler 6 via the connections 4 and 5. The flow of binary transitions coming out of opto-coupler 6 is then sent to a serial-to-parallel converter 8 which is de-serializing the information in order to assemble the data words. The latter are sent via connection 9 to processing unit 10. The information generated by processing unit 10 are sent via connection 11 to be serialized in parallel-to-serial converter 12 which is connected to pin 5 of DIN connector 14 (labeled OUT) via connection 13.

DIN connector 3 (labeled THRU) has its pin 5 connected to the signal coming from opto-coupler 6 via connection 15.

Figure 2:
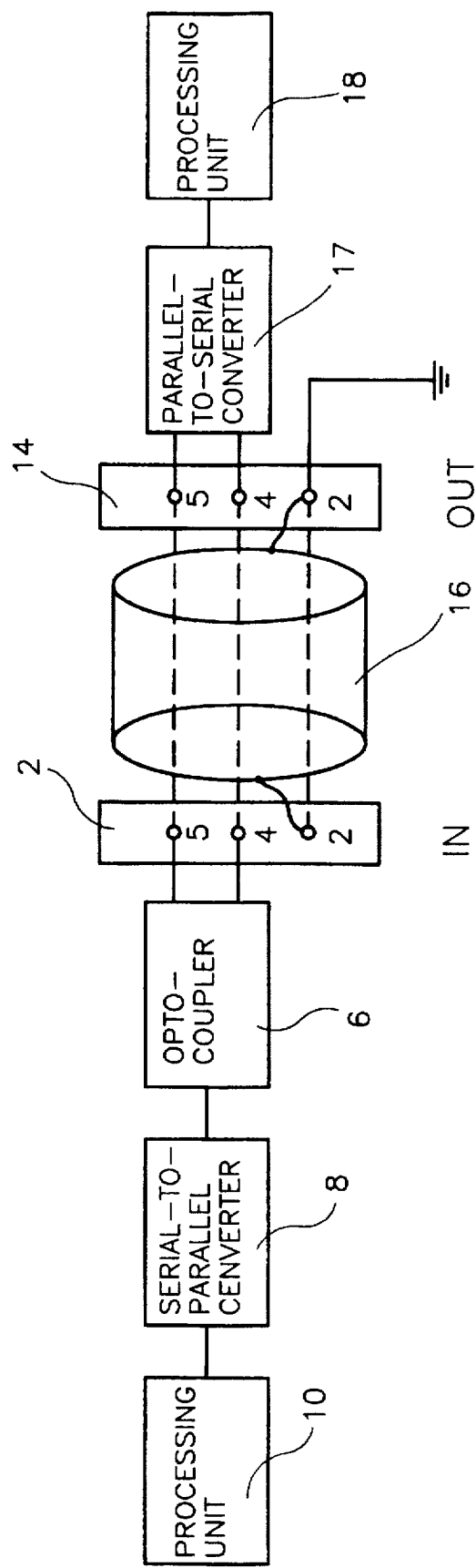
FIG. 2 shows the two devices of FIG. 1 connected through a link according to the present invention.

FIG. 2 shows two devices according the state of the art connected through a link which conforms with the MIDI standard. The first device comprises a processing unit 10, a serial-to-parallel converter 8 and an opto-coupler 6 connected to DIN connector 2 (IN). An electrical cable 16 is connecting pins 2, 4 and 5 of this connector to pins 2, 4 and 5 of DIN connector 14 (OUT) of the second device. Inside the latter, the OUT connector 14 is linked to parallel-to-serial converter 17, itself connected to processing unit 18.

The communication system according to the invention is also detailed in the following description illustrated by FIG.

Figure 3:
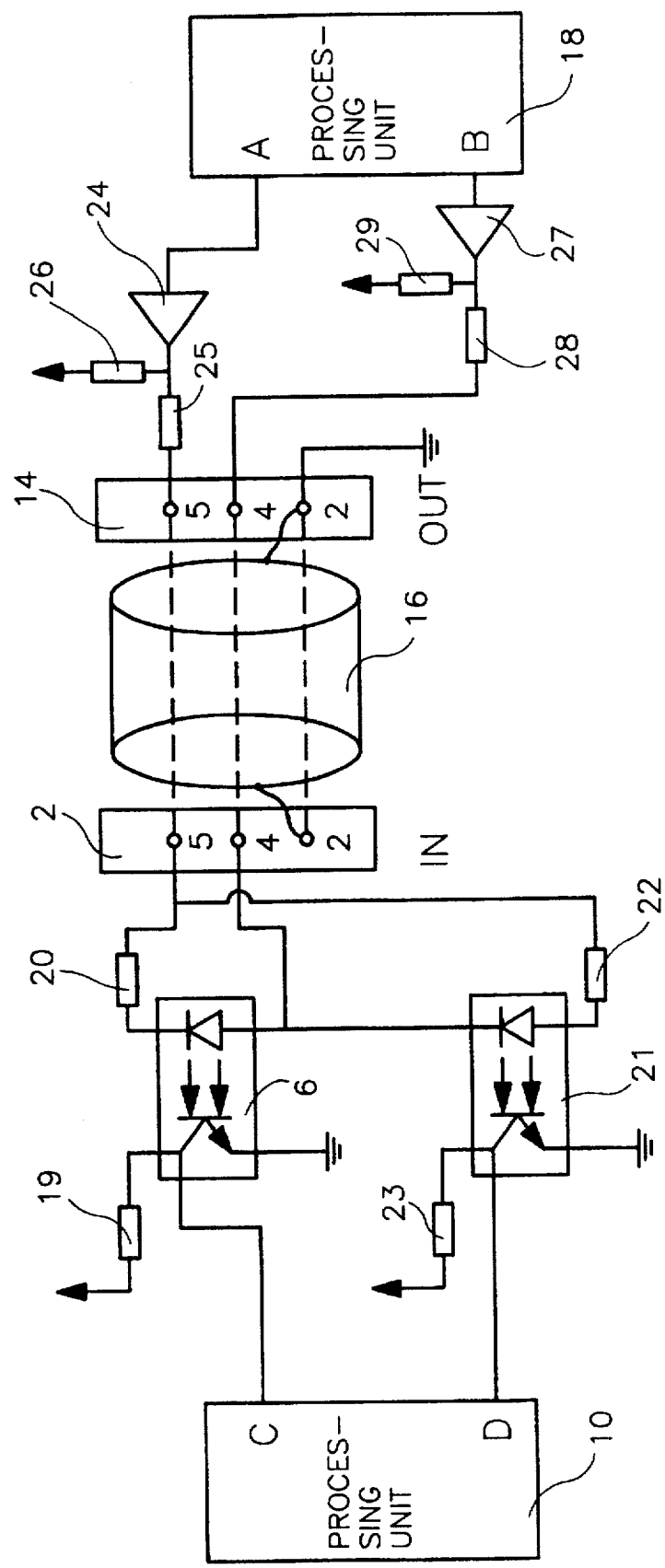
FIG. 3 shows a schematic representation of the system generating ternary transitions.

3 schematizing said system. FIG. 3 gives a practical realization of the technique to generate ternary transitions. Processing unit 18 does itself the parallel-to-serial conversion of the information without requesting the use of a separate parallel-to-serial converter. The serialized information is sent over the output A of processing unit 18 and enters line amplifier 24 which output is connected through resistor 26 to the power supply and through resistor 25, to pin 5 of DIN connector 14 labeled OUT. A second output B from the same processing unit 18 is connected to pin 4 of connector 14 through line amplifier 27 and resistor 28, the output of the amplifier being also connected to the power supply through resistor 29.

On the receiving device side, two opto-couplers 6 and 21 are connected to pins 4 and 5 of connector 2 labeled IN through resistors 20 and 22. The outputs of these opto-couplers enter directly the inputs labeled C and D of processing unit 10.

Processing trait 18 is programmed so that at any time, the signal on its output B is only sent when output A is at rest state. Likewise, when output A is emitting a signal, the output B is programmed to remain at the rest state.

Figure 4:
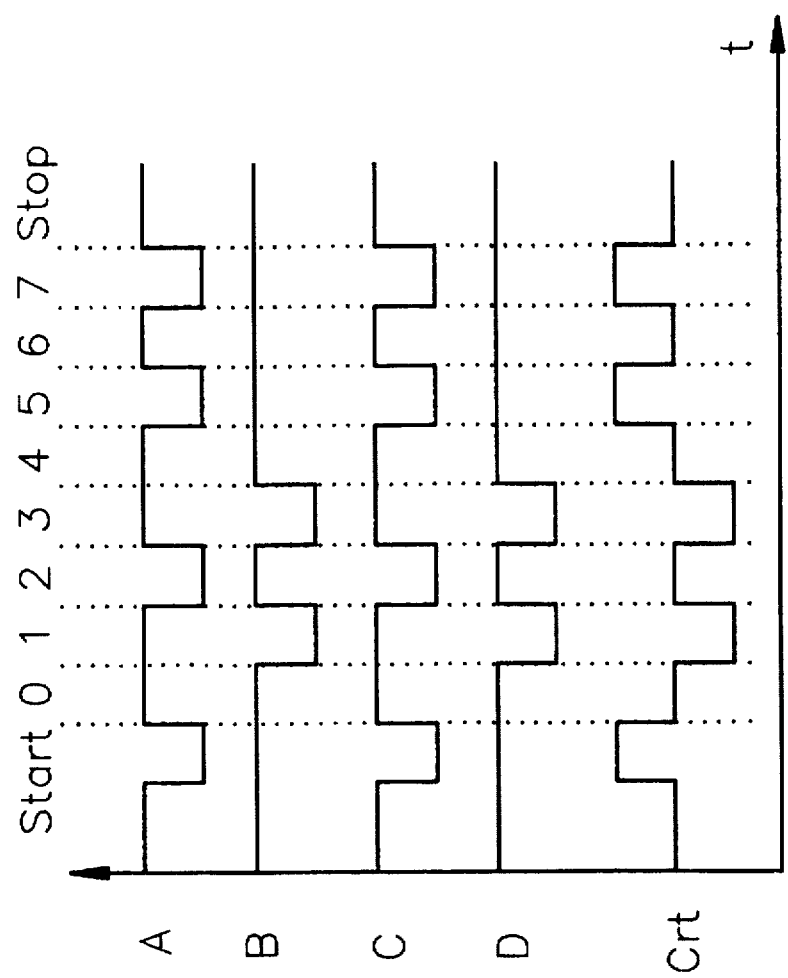
FIG. 4 shows a timing diagram.

FIG. 4 shows a timing diagram to illustrate the transmission by the emitting device of the FIG. 3 of the message made of a "start" bit, followed by a normal bit, a symmetrical bit, a normal bit, a second symmetrical bit and four normal bits and a "stop" bit. The state of the outputs A and B of the emitter's processing unit as well as the state of the inputs C and D of the receiver's processing unit are shown first. The bottom line shows, over time, the current flowing in the cable linking the two devices.

Any of those devices can be able, if necessary, to work as an emitting device at the same time as a receiving device. Should the occasion arise, that device will include the interface circuitry of an emitting device as well as the interface circuitry of a receiving device which have been described separately hereabove.

Figure 5:
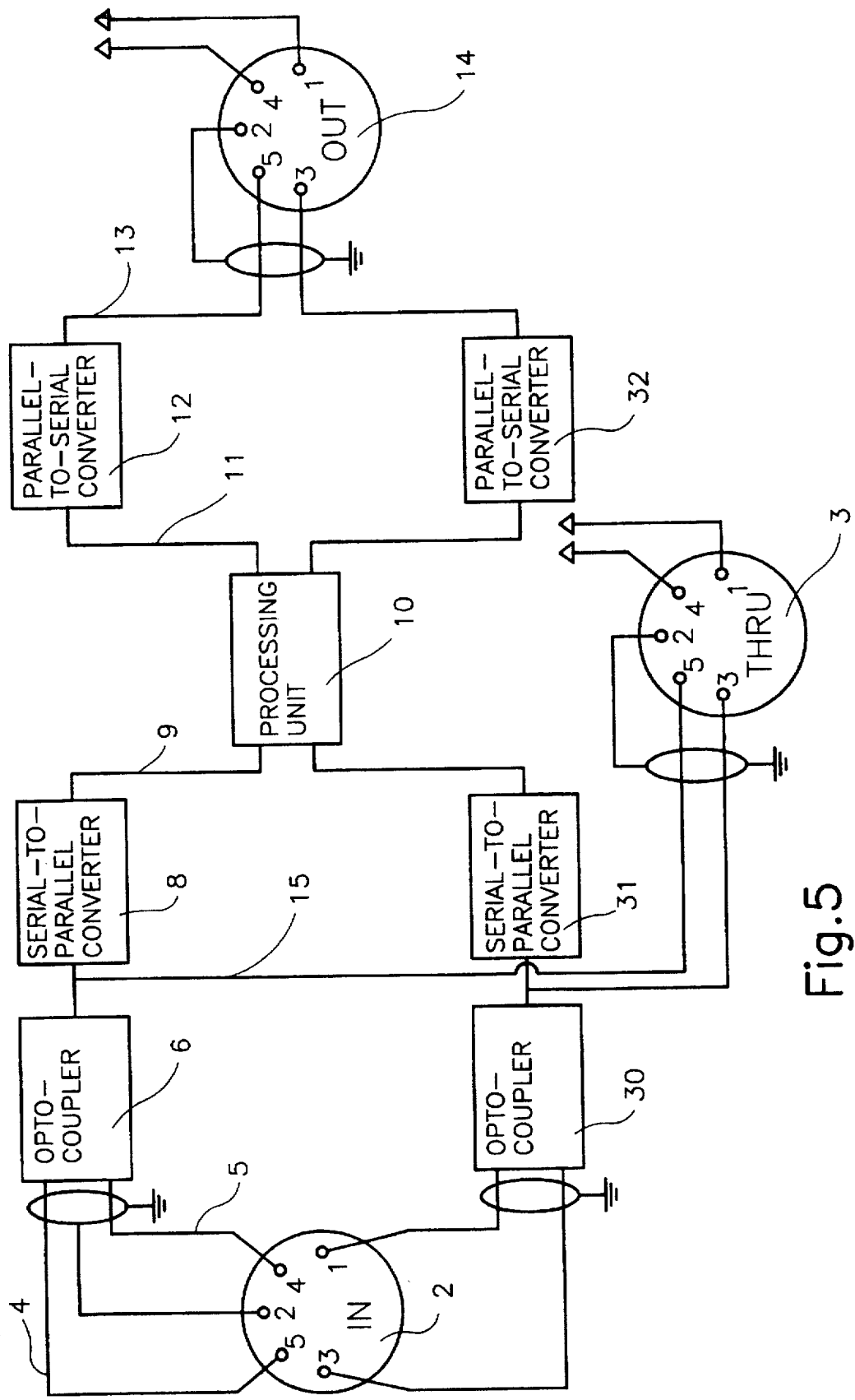
FIG. 5 shows a device according to FIG. 1 connected to a link of a second embodiment.

FIG. 5 shows a device according to the invention similar to the one from the prior art shown on FIG. 1, except that it does include an additional second opto-coupler 30 and two converters, serial-to-parallel 31 and parallel-to-serial 32 dedicated to handle the second support. That second support is connected to pins 1 and 3 of DIN connectors 2 (IN), 14 (OUT) and 3 (THRU).

Example which follows intends to describe the invention in a practical way without however limiting its scope.

A system for the communication of information compliant with the MIDI standard and based on the sketch-plan of FIG. 3, wherein used components had the following characteristics, has been realized:

processing units 10 and 18: microcontrollers SGS Z86E21 opto-couplers 6 and 21: Hewlett-Packard 6N136 line amplifiers 24 and 27: Texas Instruments SN74ALS541 (⅔)

connectors 2 and 14: 5 pin DIN 180° female resistors 19, 23, 26 and 29: 2.2 kOhm resistors 20, 22, 25 and 28: 220 Ohm.

I claim:

1. A process for transmission of a larger quantity of information between at least two musical devices according to the MIDI standard, according to which elements of information which are succeeding each other in a time sequence are passed along over an electrical support, said elements of information being made of a packet of binary transitions forming messages which comprise one or more data and/or addresses of the musical devices for which these data are intended, said process causing no increase of the number of transitions flowing over the electrical support and allowing nevertheless to increase the amount of various distinct messages which a system is able to convey, the process comprising:

generating a normal MIDI message coded by means of a time sequence of binary transitions implemented as a possible presence of a current flowing through the electrical support and having an OFF state and an ON state materialized with, respectively, an absence and a presence of a current through the electrical support;

selecting all the OFF state of the binary transitions of the messages, i.e. periods during which there is no current which flows through the electrical support;

launching a reverse current within some of said OFF state selected binary transitions so as to implement a three-state logic when said binary logic is in the OFF state and to keep said binary logic unchanged when this binary logic is in the ON state.

2. The process according to claim 1, characterized in that the ternary state 1 is the absence of current over the support, the ternary state 0 is the presence of current and the ternary state −1 is reverse-flowing current.

3. The process according to claim 3, characterized in that a second support, parallel to the first is used to generate additional binary and/or ternary transitions.

4. A system for the communication of information allowing the transmission of a larger quantity of information between at least two musical devices according to the MIDI standard, comprising:

means for connecting a first musical device to a second musical device through an electrical cable;

means for coding information in a mixed binary and ternary logic;

means for flowing information between the two musical devices as elements succeeding each other in time sequence on the electrical cable and materialized by an absence and a presence of a current and a reverse current within the electrical cable, respectively;

each musical device comprising an emitter section with a pair of line amplifiers so that one of the line amplifiers is able to transmit a signal only when the other line amplifier transmits no signal, both line amplifiers behaving as a modulated ground and a modulated power supply in order to implement a current loop;

each musical device comprising a receiver section built around a pair of optical couplers having a light-emitting diode and a phototransistor capable to act as a current switch presenting a low impedance subject to a reception of light from said light-emitting diode and returning to a high-impedance state in an absence of that light, said couplers being connected through said electrical cable to the line amplifiers of the emitter section of the other musical device so that each output signal of said optical coupler relates to said corresponding input signal of the corresponding amplifier and said phototransistor of each optical coupler being in a low impedance state only when the other phototransistor is in the high impedance state.

5. The system according to claim 4, further comprising:

a second similar current loop aside said first current loop for doubling the information capacity of the system; and means for connecting said second current loop to free pins of a standard 5 pin-DIN MIDI connector numbered (1) and (3).

* * * * *